Sept. 30, 1947.  A. G. MAPP  2,428,234
INTERNAL MICROMETER
Filed March 23, 1943  2 Sheets-Sheet 1
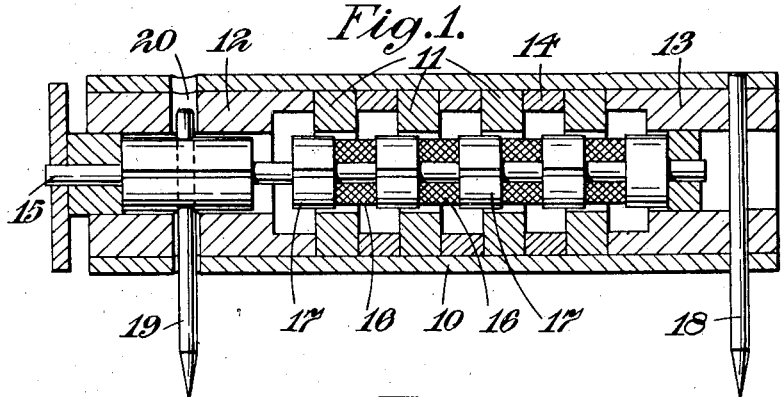
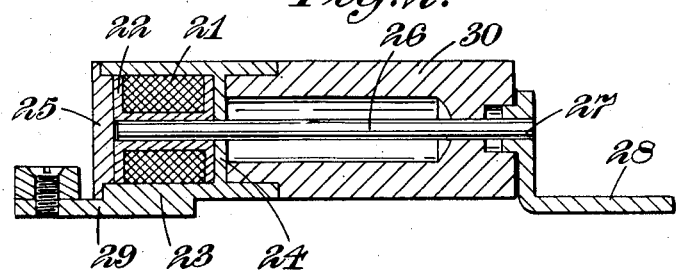
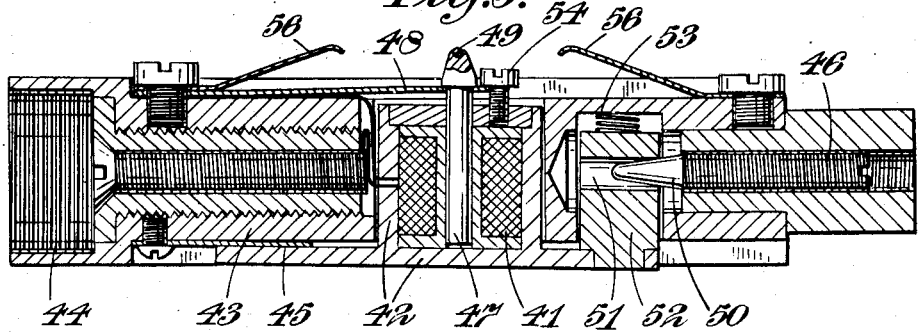
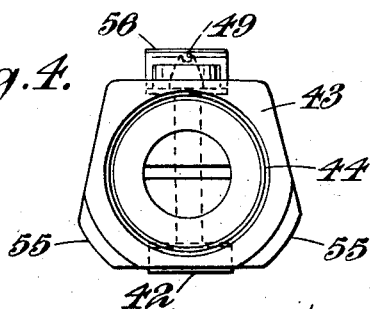
Inventor
Alfred G. Mapp
by Wilkinson & Mawhinney
Attorneys Sept. 30, 1947.   A. G. MAPP   2,428,234
INTERNAL MICROMETER
Filed March 23, 1943   2 Sheets-Sheet 2

Inventor
Alfred G. Mapp
by Wilkinson & Mawhinney
Attorneys

Patented Sept. 30, 1947

2,428,234

UNITED STATES PATENT OFFICE 2,428,234

INTERNAL MICROMETER

Alfred George Mapp, Cheltenham England, assignor to Rotol Limited, a British company Application March 23, 1943, Serial No. 480,242
In Great Britain January 16, 1942

2 Claims. (Cl. 171—242)

The invention relates to electric measuring devices of the kind in which mechanical movements of a member towards or away from a datum setting are represented by changes in the value of an electric current.

An object of the invention is to provide a simple and easily calibrated instrument of the above kind by which extremely accurate measurements of dimensions and changes in dimension may be obtained.

A further object is to provide an instrument which may be used as an extensometer, for measuring changes in length of a member produced by stress, or to provide an internal micrometer.

Yet a further object is to provide an improved gauge for the accurate measurement of pressures, and particularly of high pressures.

The measuring instrument according to this invention comprises an inductance coil completely shrouded in magnetic material and having a core movable in it to vary an air-gap in the magnetic circuit whereby movements of the core relatively to the coil cause changes in the inductance value of the coil.

According to another feature of this invention, means are provided for measuring or indicating changes in the inductance value of the coil, comprising means for generating a high frequency alternating current, an impedance network of which the said coil forms one part, and a calibrated indicating device, such as a moving coil galvanometer, whereby variations of potential across or current in the said coil are ascertainable directly, and show variations of the inductance value of the coil produced by the movement of the core.

The invention also includes various constructions of instruments as hereinafter described embodying the aforesaid parts.

In the accompanying drawings:

Figure 1 is a central sectional view showing one construction of device for measuring changes in a linear dimension, such as an extensometer, Figure 2 is a similar view of an alternative construction of extensometer.

Figure 3 is a central sectional view of an internal micrometer gauge,

Figure 4 is an end view of Figure 3,

Figure 5:
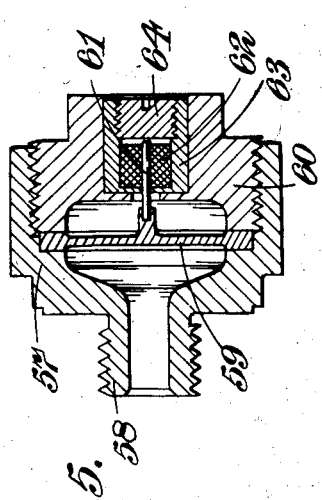
Figure 5 is a sectional view of a pressure measuring device.

Referring first to Figure 1, the device comprises a body or casing 10 wherein there are mounted a plurality of spaced annular laminated or solid rings 11 of magnetic material. They are rigidly secured together so as to be incapable of relative movement, being secured for example by end blocks 12, 13 and intervening spacing pieces 14 which are also of magnetic material. Within these magnetic elements there is mounted a rod 15 carrying a corresponding plurality of coils 16 which are spaced between cylindrical shoulders 17 provided on the rod. These shoulders 17 are of magnetic material and have a very small clearance in the apertures of the ring-like members 11. The shoulders 17 are slightly staggered with respect to the parts 11 so that endwise movement of the rod causes the cross-sectional areas of the air-gaps between them to be varied, thereby varying the inductance of the coils.

The gauge points for the instrument are constituted by two rods of which one, 18, is mounted transversely in the casing 10 and block 13, whilst the other, 19, is mounted on the rod 15 being located in a diametral hole 20 in the casing which provides sufficient clearance to allow movement of the rod 19 relatively to the rod 18 in accordance with the range of measurements which is to be measured.

In the construction of extensometer illustrated in Figure 1, any change in the spacing between the rods 18, 19 which is to be noted produces a change in the cross-sectional area of the path of the magnetic flux, and it will be appreciated that apart from the two air-gaps in the magnetic path for each coil, each coil is completely shrouded magnetically, and is therefore unaffected by stray magnetic fields; Figure 2 shows a modified construction in which the length of the air-gap is altered instead of its cross-sectional area. In this construction, a coil 21 wound on a suitable bobbin 22 is mounted in a "pot" constituted by a tube-section 23 blanked off near one end by a diaphragm 24 and having a cap 25 closing the other end. The parts 23, 24 and 25 are of magnetic material to constitute a complete enclosure for the bobbin, and the diaphragm 24 has a central hole through which extends a plunger 26 constituting a magnetic core for the coil. This plunger 26 may be of any desired length and it is rigidly secured at the end 27 to a foot 28 which is adapted in any convenient manner to be secured to a part or member whereon a measurment is to be made. Similarly, the coil and its shrouding is mounted on another foot 29 also adapted to be secured on the member being tested. The plunger 26 extends through the coil into close proximity with the cap 25 to provide a very small air-gap in the magnetic circuit of the coil 21, and any relative movement between the two feet 28, 29, which carry respectively the plunger 26 and the cap 25, results in a variation of this air-gap which causes a change in the inductance value of the coil 21. When the total length of the gauge is of the order of 1 inch, the air-gap will be of the order of two ten-thousandths of an inch.

There is also provided a suitable non-magnetic spacing member 30 between the two feet 28, 29, which acts as an enclosure for the plunger 26; adjustment of the air-gap may be effected by the use of shims between the end of the part 30 and the foot 28.

Figure 6:
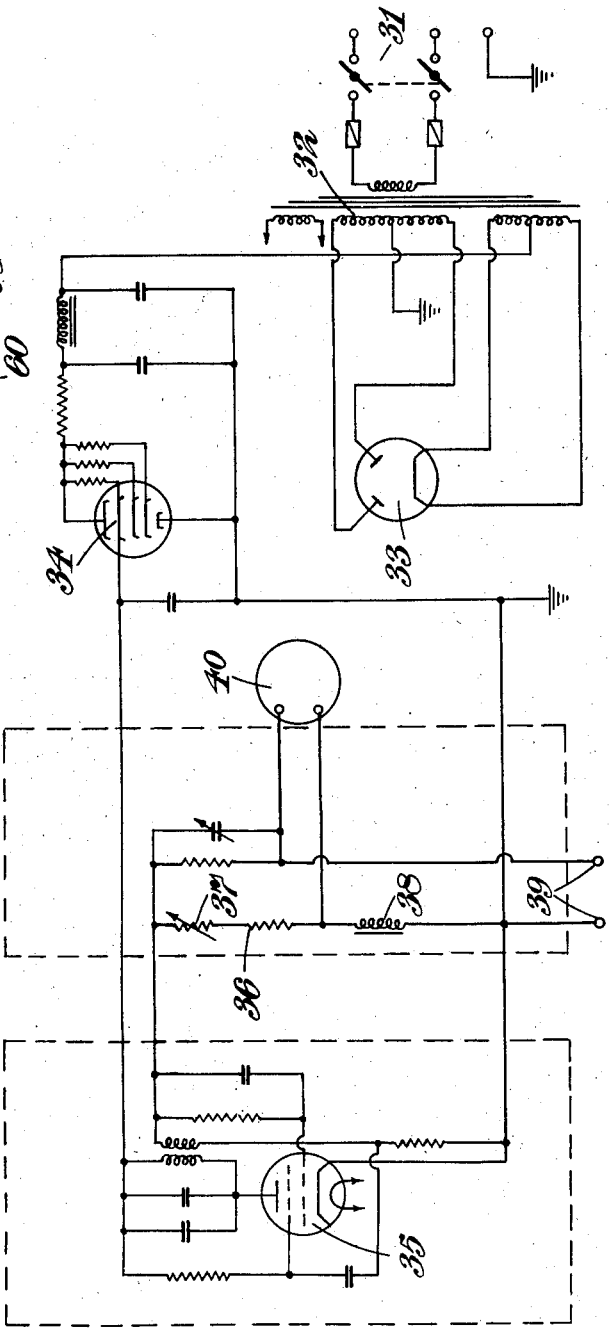
Figure 6 is a circuit diagram showing the connections of any of the devices illustrated in Figures 1 to 5 to a measuring instrument.

In both of the devices above described, the measurement of the inductance value of the coils or coil, which gives a measure of the change in the air-gap of the magnetic circuit, is preferably effected by an arrangement as illustrated in the circuit diagram Figure 6. A high frequency current is supplied to the coils or coil, being derived from an alternating current mains supply indicated at 31 through a transformer 32 to a single rectifying valve 33. The output of this valve is taken through the usual smoothing circuits and a stabilising glow discharge tube 34 of the kind known as "Stabilovolt" (registered trade-mark) to an oscillator circuit of any usual arrangement comprising a tetrode thermionic valve 35 of which the output is of the order of 50 volts at a frequency of about 11,000 cycles per second. This output is delivered to a bridge circuit of which the two arms 36, 37 are resistances of the order of 1,500 ohms and the other arms comprise respectively a balance inductance 37 and the coil or coils of the gauge which is connected to the terminals 39. An indicating instrument 40 may be connected to the bridge and in the case of an alternating rectifier volt meter having a resistance of 2,500 ohms, a sensitivity of 1 volt per .001 inch movement of the core of the gauge can be obtained. Thus with a meter having a 3½ inch scale and reading to 1 volt, a linear magnification can be obtained of 3,500:1, so that direct readings may readily be made to one-seventy-thousandth of an inch.

As mentioned above, the frequency of about 11,000 cycles per second is selected as it enables an impedance of the required order to be arranged in the small space and having a magnetic circuit which will enable a reasonable value of current for operating the indicating instrument 40 to be carried; it is also possible to measure alternating strains up to a frequency of say, 2,000 cycles per second. For this purpose, a cathode ray oscilloscope may be used as a measuring or indicating instrument, and in this case a steady strain appears as a sine wave of uniform amplitude, the amplitude being a measure of the strain. If the member under test is vibrated, or subjected to an alternating stress, then the oscilloscope shows a modulated high frequency wave of which the mean amplitude is a measure of the steady strain, and the modulation envelope gives a measure of the alternating strains. Conveniently a recording oscillograph is used for this purpose, so that measurements can be made on the resulting record.

Instead of using a recording instrument, a heavily damped meter can be connected across the output circuit to read the steady strains, and a part of this output can be fed through a rectifier circuit, such as a thermionic valve detector, and the output of this detector read by a suitable meter or recording oscillograph in order to obtain the alternating strains. It will be appreciated that the invention is not limited to the particular circuit shown, for many variations of it are possible, the fundamental requirement being that an indication should be given of the variation of the inductance value of the coil or coils in the gauge.

Figures 3 and 4 illustrate a construction of internal micrometer according to this invention. In this case, a coil 41 mounted in a magnetic pot 42 similar to that already described, is mounted in a suitable carrier indicated generally by the reference 43. This carrier is conveniently supported on a flexible handle engaged with its end 44, and the coil unit is mounted on the carrier by a spring 45 so that it is movable transversely of the axis of the carrier. Its position is adjusted by means of a pin 46 having a tapered end 50 engaging an axial bore 51 in a block 52 carried by the pot, so that as the pin 46 is screwed in or out it moves the block 52 transversely against the action of a compression spring 53.

The core 47 of the coil 41 is mounted on a light spring 48 which tends to move the core away from the base of the pot 42 so as to provide the variable air-gap, and the upper end of the core is provided with a contact-member constituted by a hardened steel ball 49 or a suitable jewel. The range of movement of the spring 48 is limited by a set screw 54. The body 43 is shaped as shown in Figure 4 at 55 so as to seat itself in a hole in which the device is used, by means of the springs 56 (see Figure 3) which press the surfaces 55 on to the wall of the hole. The spring 48 presses the plunger 49 outwards. The coil 41 is connected in a circuit as hereinbefore described for measuring any changes in its inductance value.

In using this device, the pin 46 is unscrewed to the limit of its movement, and the device is inserted in a standard ring gauge of the required diameter. The pin 46 is then screwed in until the pointer of the meter reads zero, and this indicates that the pot assembly with the coil has been moved up so that the gap at the bottom of the core 47 is set to the desired standard. The device is then inserted in any hole or bore of which the internal diameter is to be checked. Any variation in such diameter results in a movement of the core 47 which is shown as a reading on the instrument. By rotating the device in the hole any ovalness will be detected, or the presence of scratches will be shown, together with an indication of their actual depth. It has been found that with a suitably graduated instrument, a semi-skilled operator can readily check dimensions of a ⅜ inch diameter bore over 4 inches deep, to an accuracy of plus or minus one-thirty-thousandth of an inch.

Figure 5 illustrates yet another application of this invention to a pressure measuring device which is particularly suitable for the accurate measurement of high pressures, for example, of the order of 500 pounds per square inch or more, although it will be appreciated that it can, by suitable modification, be used for other pressures.

The body of the device 57 is provided with a screw-threaded connector 58 for connection to any fluid-pressure system whereof the pressure is to be ascertained, and there is mounted in this body a diaphragm 59 secured in it by means of a block 60 screwed into the body and pressing the diaphragm against a shoulder therein. The diaphragm is made of a strength and stiffness appropriate to the range of pressures to be measured and at its centre it is coupled directly to the core 61 of a coil 62 mounted in a magnetic pot 63 in the manner described with reference to the other devices. The core 61 is spaced away from the block 64 constituting the base of the pot 63 to provide the variable air-gap and it will be seen that in this particular arrangement the application of pressure to the diaphragm 59 diminishes the length of the air-gap so that the inductance value is increased and the measuring instrument is appropriately connected to measure a fall in the current in the coil.

I claim:

1. An instrument for the purpose described comprising a carrier, a coil and coil pot unit pivoted at one end portion to one end portion of the carrier with the axis of the coil at substantially right angles to the axis of the carrier, a core adjustable axially in the coil to provide a variable magnetic air gap, a spring on the carrier supporting the core and biasing the core to an outermost position for providing a maximum air gap, an adjusting device coupled to the spring and carrier to limit the outward movement of the core with respect to the coil, spring means between the carrier and unit for biasing the unit to an outermost lateral position with respect to the carrier and for moving the coil away from the core a maximum distance, said unit having an axial bore, and a screw axially adjustable in said carrier and having a tapered end fitting in said bore.

2. An instrument for the purpose described comprising a carrier, a coil and coil pot unit having an axial bore, means for so connecting said carrier and unit that the unit may move transversely of the axis of the carrier, a core in the unit supported from the carrier for forming a magnetic air gap, and means to laterally adjust the unit with respect to the carrier and its supported core to vary the size of the air gap to a point for zeroizing the instrument, said last-named means comprising an axially adjustable member in the carrier having a tapered end fitting in the axial bore in the unit, and spring means between the carrier and unit biased to move the coil and core apart.

ALFRED GEORGE MAPP.

REFERENCES CITED

The following references are of record in the file of this patent:

UNITED STATES PATENTS

| Number | Name | Date |
| --- | --- | --- |
| 2,082,595 | Polydoroff | June 1, 1937 |
| 2,370,073 | Reason | Feb. 20, 1945 |
| 1,184,262 | Redfield | May 23, 1916 |
| 2,288,838 | Pike et al. | July 7, 1942 |
| 1,928,457 | Mershon et al. | Sept. 26, 1933 |
| 2,266,608 | Kuehni | Dec. 16, 1941 |
| 2,120,048 | Turner | June 7, 1938 |

FOREIGN PATENTS

| Number | Country | Date |
| --- | --- | --- |
| 507,837 | England | June 19, 1939 |
| 139,964 | Switzerland | Aug. 1, 1930 |